Patented Nov. 10, 1953

2,658,826

UNITED STATES PATENT OFFICE 2,658,826

PLANT DEFOLIANT

Edgar W. Clarke, Laurel Springs, N. J., and Robert B. Doan, Drexel Hill, and Vincent J. Keenan, Ardmore, Pa., assignors to The Atlantic Refining Company, Philadelphia, Pa., a corporation of Pennsylvania No Drawing. Application May 8, 1952,
Serial No. 286,832

6 Claims. (Cl. 71—2.2)

This invention relates to improvements in defoliating vegetation and more particularly is concerned with a novel herbicide composition of the defoliant type and a defoliating process utilizing such herbicide composition. By the term herbicide composition of the defoliant type, as used herein, is meant a herbicide composition which when applied to a plant such as cotton, corn, potatoes, or the like, will cause the leaves to burn and wilt, thereby exposing more completely the plant product or fruit of the vegetation so as to facilitate harvesting.

The invention comprehends a novel herbicide composition comprising a herbicide, and minor amounts of potassium cyanide and a wetting agent, and a defoliating process involving the application of such herbicide composition to vegetation whereby its leaves are caused to burn or wilt.

Herbicides of the type known as defoliants have heretofore been applied to certain plants such as potatoes and cotton plants for the purpose of stripping leaves from the plants to facilitate the removal of the potatoes and cotton by machines. It has previously been found that the effectiveness of a defoliant may be enhanced by the addition thereto of a small amount of a wetting agent. The defoliant solution—defoliants being usually applied in the form of an aqueous solution—containing the wetting agent, in part, drips off of the leaves of the plant and penetrates the ground around the plant with the result that the plant rootlets and tiny root hairs of the plant are burned. As a result, soil moisture is prevented from being absorbed by the plant and because of this fact the application of the defoliant solution to the leaves is more effective than when defoliants alone are utilized. That the addition of a wetting agent to a defoliant has little effect where the soil adjacent the plant is relatively dry is common knowledge. Thus, in order to increase the effectiveness of a defoliant in stripping leaves from plants by the addition thereto of a wetting agent, it has been necessary to apply the mixture during the time when the soil is relatively moist. However, in commercial practice obviously the harvesting of crops cannot be delayed until such time as rainfall occurs in sufficient quantity to appreciably wet the soil adjacent the plants.

Accordingly, it is one object of the present invention to provide a novel herbicide composition of the defoliant type which is highly effective in the treatment of plants, and a defoliating process employing such composition.

Another object of the invention is to provide an improved process and herbicide composition for defoliating plants growing in either a dry or moist soil at the time of application.

Other objects and features of the invention will be apparent from the detailed description which follows.

We have found that the addition of a minor amount of potassium cyanide to a herbicide of the defoliant type, together with a minor amount of a wetting agent, will greatly enhance the ability of the herbicide to defoliate plants. Further, the effectiveness of a herbicide is markedly increased when the novel herbicide composition is applied at a time when the soil is relatively dry although improve dresults are also obtained by application of the novel composition at a time when the soil contains a substantial amount of moisture. Specifically, we have found that a composition comprising essentially a herbicide, and minor amounts of potassium cyanide and a wetting agent is highly effective in defoliating plants and the presence of the potassium cyanide and the wetting agent in the mixture greatly reduces the amount of herbicide which would be required to defoliate a given plant or plants.

It is to be understood that the amount of the improved herbicide composition to be used in defoliating a plant may vary over a wide range and is not critical, depending, among other things, upon the particular plant, the nature of the herbicide, and the amount of leaves to be eliminated. For this reason it is not possible to set forth herein the specific quantity of the herbicide composition which should be used in a particular case, but this may be determined readily by trial and observation.

As hereinbefore mentioned, it is the general practice in commercial operations to apply a herbicide to a plant in the form of an aqueous solution. However, use of the herbicide composition of this invention is not so limited. If desired, the novel herbicide composition may be applied in the form of a powder or dust and it will become effective upon contact thereof by moisture.

Herbicides which are useful in the composition and process of this invention include any of the well known or commercial herbicides such, for example, as potassium arsenite, potassium trichloroacetate, and potassium cyanate. We have found that potassium cyanate is especially suitable for the purpose of this invention.

The potassium cyanide is present in the herbicide composition only in minor amounts such as from 1 or 2% up to about 15% by weight. Inherently, potassium cyanide is a plant stimulant and consequently the use of large amounts of the material in admixture with a herbicide and wetting agent would not produce the desired results.

The alkyl benzene sulfonates are particularly useful as the wetting agent in the composition and process of the present invention. The alkyl benzene sulfonates which may be employed in accordance with this invention include di- and trialkyl benzene sulfonates having an alkyl group of at least 5 carbon atoms and monoalkyl benzene sulfonates having at least 9 carbon atoms and preferably 9 to 15 carbon atoms. Specific examples are the sulfonates of nonyl benzene, nonyl propyl benzene, nonyl dimethyl benzene, nonyl diethyl benzene, nonyl methyl ethyl benzene, nonyl methyl propyl benzene, nonyl ethyl propyl benzene, nonyl dipropyl benzene, decyl benzene, decyl toluene, decyl ethyl benzene, decyl propyl benzene, decyl dimethyl benzene, decyl diethyl benzene, decyl methyl ethyl benzene, decyl methyl propyl benzene, decyl ethyl propyl benzene, decyl dipropyl benzene, undecyl benzene, undecyl toluene, undecyl ethyl benzene, undecyl dimethyl benzene, undecyl diethyl benzene, undecyl methyl ethyl benzene, undecyl methyl propyl benzene, undecyl dipropyl benzene, dodecyl benzene, dodecyl toluene, dodecyl ethyl benzene, dodecyl propyl benzene, dodecyl dimethyl benzene, dodecyl diethyl benzene, dodecyl methyl ethyl benzene, dodecyl methyl propyl benzene, dodecyl dipropyl benzene, tridecyl benzene, tridecyl toluene, tridecyl ethyl benzene, tridecyl propyl benzene, tridecyl dimethyl benzene, tridecyl diethyl benzene, tridecyl methyl ethyl benzene, tridecyl methyl propyl benzene, tridecyl dipropyl benzene, tetradecyl benzene, tetradecyl toluene, tetradecyl ethyl benzene, tetradecyl propyl benzene, tetradecyl dimethyl benzene, tetradecyl diethyl benzene, tetradecyl methyl ethyl benzene, tetradecyl methyl propyl benzene, tetradecyl dipropyl benzene, pentadecyl benzene, pentadecyl toluene, pentadecyl ethyl benzene, pentadecyl propyl benzene, pentadecyl dimethyl benzene, pentadecyl diethyl benzene, pentadecyl methyl ethyl benzene, pentadecyl methyl propyl benzene, and pentadecyl dipropyl benzene or mixtures thereof; or such sulfonates and mixtures thereof together with a minor proportion of a low molecular weight di- or trialkyl benzene sulfonate, such as xylene, methyl ethyl benzene, methyl propyl benzene, diethyl benzene, ethyl propyl benzene, trimethyl benzene, methyl diethyl benzene, methyl ethyl propyl benzene, and triethyl benzene.

The alkyl benzene sulfonate contained in the herbicide composition may vary from about 1% up to about 25% by weight. The quantity used in any particular case is not critical, however, and depends upon the particular alkyl benzene sulfonate, and the herbicide used, among other things. It should not be applied, however, to the soil in an amount greater than approximately 4 lbs. per acre since such material when applied in large quantities to vegetation and soil has the effect of stimulating plant growth.

The present invention may be further illustrated by the following examples, which, however, are not to be construed as limiting the scope thereof. In these examples, a commercially available alkyl benzene sulfonate was employed, such agent having been produced by polymerizing a gaseous mixture containing predominantly propylene (80%) with minor amounts of propane and lower boiling hydrocarbons, using a supported phosphoric acid catalyst at 500° F. and 400 lbs./sq. in. pressure, to obtain a mixture of propylene polymers from which was separated by fractional distillation, a fraction averaging 12 carbon atoms per molecule. This fraction was then employed to alkylate benzene, using $AlCl_3$ as a catalyst at 150° F. The resulting mixture of alkylated benzenes was distilled to recover a fraction averaging 12 carbon atoms in the alkyl group (the fraction actually contained minor amounts of $C_9$ to $C_{15}$ alkyl benzenes). This fraction, upon sulfonation with 98% sulfuric acid at 160° F. yields the corresponding alkyl benzene sulfonic acids, which, after separation from the spent sulfuric acid, were neutralized with sodium hydroxide and recovered as essentially sodium dodecyl benzene sulfonates containing a small amount of inorganic salts, i. e., sodium sulfate. It is to be understood, however, that the invention is not restricted to the use of the sodium alkyl benzene sulfonates, but contemplates other water soluble salts of the alkyl benzene sulfonates such as the potassium, calcium, magnesium, ammonium, and tetramethylammonium.

The general procedure for manufacturing sulfonates of this type is described in various United States patents, including U. S. Nos. 1,992,160; 2,232,118; 2,430,673; 2,477,372; and 2,477,383, and does not constitute any part of the present invention.

The essentially $C_{12}$ alkyl benzene sodium sulfonate was employed as follows:

EXAMPLE I

Pigweed was grown in a series of plots of sandy sub-soil devoid of organic matter and having the following analysis (ASTM Test D422–39); 81.0% sand; 13.0% silt; and 6.0% clay. A number of the plots were selected which contained, by visual examination, approximately the same amount of pigweed growth and the selected plots were variously treated as shown in Table 1 with a herbicide (potassium cyanate), alone or together with potassium cyanide or the alkyl benzene sulfonate, or with the novel herbicide composition of this invention. The treatment given each of the plots was in the form of a 1% aqueous solution and at the time of application the sandy sub-soil was relatively dry, containing only 5% moisture by weight. Thirty days after treatment, the various plots were examined and a determination made visually of the per cent of the pigweed defoliated. The results are set forth in Table 1.

*Table 1*

| Plot No. | KCNO (lbs./acre) | KCN (lbs./acre) | Alkyl Benzene Sulfonate (lbs./acre) | Pigweed Defoliated (percent) |
|---|---|---|---|---|
| 1 | 10 | 0 | 0 | 40 |
| 2 | 20 | 0 | 0 | 85 |
| 3 | 10 | 0 | 0.5 | 40 |
| 4 | 10 | 1 | 0 | 44 |
| 5 | 10 | 1 | 0.5 | 90 |

From Example I and the data presented in Table 1, it will be seen that the novel herbicide composition in highly effective in defoliating vegetation and that the addition of potassium cyanide and a wetting agent to a herbicide substantially decreases the amount of such herbicide required to defoliate a given amount of vegetation. Specifically, it will be seen that in the case of the novel herbicide composition—plot No. 5 having been treated with the composition of the present invention—approximately twice as much of the pigweed was killed or defoliated as resulted from the treatment of the pigweed with potassium cyanate alone (plot No. 1), potassium cyanate and alkyl benzene sulfonate (plot No. 3), or potassium cyanate and potassium cyanide (plot No. 4). Moreover, the novel herbicide composition containing 10 lbs./acre potassium cyanate was more effective in defoliating the pigweed than 20 lbs./acre of potassium cyanate alone (plot No. 2). Thus it is apparent that by use of the herbicide composition of this invention the amount of herbicide required in a defoliating operation may be very materially reduced, thereby providing a more economical defoliating process. Further, such process and herbicide composition are especially useful when the soil is relatively dry.

EXAMPLE II

The procedure of Example I was repeated substantially using other plots of pigweed having practically the same amount of growth. In this example, however, the treatments given the various plots, as set forth in Table 2, were applied to the soil after it had been moistened, the soil containing 11.8% moisture by weight. The material was again applied to the soil in the form of a 1% aqueous solution and thirty days after treatment a visual examination was made to determine the per cent of pigweed killed or defoliated. The results are presented in Table 2.

Table 2

| Plot No. | KCNO (lbs./acre) | KCN (lbs./acre) | Alkyl Benzene Sulfonate (lbs./acre) | Pigweed Defoliated (Percent) |
|---|---|---|---|---|
| 1 | 10 | 0 | 0.0 | 40 |
| 2 | 20 | 0 | 0.0 | 85 |
| 3 | 10 | 0 | 0.5 | 75 |
| 4 | 10 | 1 | 0.5 | 90 |

Example II and the data given in Table 2 further demonstrate that a herbicide composition comprising essentially a mixture of a herbicide and minor amounts of potassium cyanide and a wetting agent is highly effective in defoliating vegetation and that the addition of potassium cyanide and a wetting agent to a commercial herbicide reduces the amount of the latter which would be required in any particular case to accomplish defoliation of a particular plant or plants. A comparison of the results for plot No. 3 and plot No. 4 shows that the novel herbicide composition is more effective for defoliating vegetation even under moist soil conditions than a mixture of the same herbicide and wetting agent, although the comparison is not as spectacular as under dry soil conditions. By comparison of plot No. 1 and plot No. 2 with plot No. 4, it will be noted that the herbicide composition of the invention is markedly superior to the herbicide alone.

It is to be understood that the improved herbicide composition and process using such composition to defoliate vegetation are applicable or useful in the treatment of any type of vegetation which it is desired to defoliate, including plants such as corn and cotton, grasses, weeds and any other type of vegetation.

We claim:

1. An improved herbicide composition of the defoliant type comprising essentially a mixture of a cyanate defoliant, and a minor amount of potassium cyanide and a wetting agent.

2. An improved herbicide composition of the defoliant type comprising essentially a mixture of a potassium cyanate, and a minor amount of potassium cyanide and a wetting agent.

3. An improved herbicide composition of the defoliant type comprising essentially a mixture of a cyanate defoliant, from 1 to 15 per cent of potassium cyanide, and from 1 to 25 per cent by weight of an alkyl benzene sulfonate having from 9 to 15 carbons in the alkyl group.

4. A process for defoliating vegetation which comprises applying to said vegetation an improved herbicide composition of the defoliant type comprising essentially a mixture of a cyanate defoliant, and a minor amount of potassium cyanide and a wetting agent.

5. A process for defoliating vegetation which comprises applying to said vegetation an improved herbicide composition of the defoliant type comprising essentially a mixture of a potassium cyanate, and a minor amount of potassium cyanide and a wetting agent.

6. A process for defoliating vegetation which comprises applying to said vegetation an improved herbicide composition of the defoliant type comprising essentially a mixture of a cyanate defoliant, from 1 to 15 per cent of potassium cyanide, and from 1 to 25 per cent by weight of an alkyl benzene sulfonate having from 9 to 15 carbons in the alkyl group.

EDGAR W. CLARKE.
ROBERT B. DOAN.
VINCENT J. KEENAN.

References Cited in the file of this patent

UNITED STATES PATENTS

| Number | Name | Date |
|---|---|---|
| 548,966 | Curtiss | Oct. 29, 1895 |
| 2,368,275 | Torley | Jan. 30, 1945 |
| 2,393,086 | Bousquet | Jan. 15, 1946 |
| 2,546,551 | Lento et al. | Mar. 27, 1951 |

FOREIGN PATENTS

| Number | Country | Date |
|---|---|---|
| 18,129/29 | Australia | Feb. 11, 1930 |